2,930,726

COMPOSITION COMPRISING PITCH AND CHLORINATED POLYOLEFIN, ARTICLE PREPARED THEREFROM, AND METHOD OF MAKING

Rufus V. Jones and Johnny N. Scott, Bartlesville, Okla., assignors to Phillips Petroleum Company, a corporation of Delaware No Drawing. Application July 9, 1956
Serial No. 596,420

16 Claims. (Cl. 154—43)

This invention relates to tough, flexible pitch compositions. In one of its more specific aspects, it relates to the coating of articles with flexible pitch compositions.

Pitch has many useful applications including compositions used in road building, roof coverings, coverings for underground pipe lines, and the like. The useful applications are limited, however, due to the extreme brittleness of the pitch and compositions containing pitch. The use of pitch as a protective coating has been limited to rigid articles having minimum ranges of expansion and contraction so as to minimize cracking and flaking of the pitch.

It is, therefore, a principal object of this invention to provide a composition of pitch which is tough and flexible.

It is another object to provide a method for coating and impregnating articles with flexible pitch compositions.

Another object of the invention is the provision of articles coated and impregnated with flexible pitch compositions.

Broadly, the invention contemplates tough flexible pitch compositions obtained by blending with the pitch a halogenated polymer e.g., a brominated or chlorinated 1-olefin polymer. Halogenated polyethylenes are particularly adapted to the practice of this invention. Although any polyethylene in general can be halogenated and employed in the compositions of this invention, a preferred class of ethylene polymers is that having a density at 20° C. of at least 0.94 and a crystallinity at 25° C. of at least 75 percent. This class of ethylene polymers includes those prepared by polymerization in the presence of a two or more component catalyst wherein one component is an organometal compound, including those where one or more organo groups is replaced by a halogen, a metal hydride, or a metal of group I, II or III, and the second component is a group IV to VI metal compound, e.g., salt or alcoholate. Specific examples of such two component catalysts include ethylaluminum sesquichloride plus titanium tetrachloride, ethylaluminum sesquichloride plus lithium aluminum hydride, ethylaluminum sesquichloride plus titanium butoxide, triethylaluminum plus titanium tetrachloride, ethylaluminum sesquichloride plus chromyl chloride, and triisobutylaluminum plus titanium tetrachloride. Applicable two component catalysts and polymerization methods are more fully described in copending application Serial No. 576,135, filed April 4, 1956, by W. B. Reynolds et al. A still more preferred class of ethylene polymers is that having a density at 20° C. of at least 0.96 and a crystallinity at 25° C. of at least 90 percent. Most of the unsaturation in these polymers occurs in the form of terminal vinyl groups. A preferred method for the production of these polymers of ethylene is described and claimed in the copending application of Hogan and Banks, Serial No. 573,877, filed March 26, 1956, now U.S. Patent 2,825,721, issued March 4, 1958. A process is disclosed therein for producing polymers of 1-olefins having a maximum of 8 carbon atoms per molecule and no branching nearer the double bond than the 4-position by carrying out the polymerization at a temperature in the range of 100 to 500° F. in the presence of at least 0.1 weight percent of chromium oxide, preferably including a substantial proportion of hexavalent chromium associated with at least one porous oxide selected from the group consisting of silica, alumina, zirconia and thoria. A preferred catalyst is one comprising at least 0.1 weight percent chromium in the form of chromium oxide supported upon a silica-alumina base such as 90 percent silica-10 percent alumina. The catalyst employed is a highly activated catalyst which has been oxidized by treatment at an elevated temperature under non-reducing conditions and preferably in an oxidizing atmosphere. The polymers of the above-identified patent are disclosed as having a preferred range of density of 0.95 to 0.99.

Tough, flexible pitch compositions are obtained by blending with the pitch a chlorinated ethylene polymer having a chlorine content in the range between 10 and 50 weight percent chlorine, using the chlorinated ethylene polymer in an amount in the range between 15 and 90 parts by weight per 100 parts of the total composition.

The petroleum pitch employed in the compositions of this invention is preferably a high softening point material recovered by high vacuum reduction of residual hydrocarbon oils, such as topped crude, residues from topped crude cracking, fuel oils, and the like. In one manner of recovering the pitch, the residual oil charge stock is preheated to 600 to 900° F. under a pressure generally in the range between atmospheric and 100 p.s.i.g. and then subjected to vacuum distillation at an absolute pressure in the range between 0.01 and 8 mm. mercury. The residual pitch generally has a softening point (ring and ball method) in the range between 180 and 240° F.

Coal-tar pitch is obtained by the vacuum distillation of coal-tar. The coal-tar pitch should preferably have a softening point similar to that of petroleum pitch.

Chlorination of the ethylene polymers can be effected by any known method. One process involves forming a solution of the polyethylene in carbon tetrachloride at an elevated temperature and under superatmospheric pressure. When products having chlorine contents in excess of 15 weight percent are prepared, the last stages of the chlorination can be carried out at atmospheric pressure. Additional solvent is added as needed. This process is more fully described in a copending application of Canterino, Serial No. 442,891, filed July 12, 1954. Another method comprises starting the chlorination in the presence of a solvent such as tetrachloroethane and completing the reaction in the presence of a relatively low boiling solvent such as carbon tetrachloride. This process is more fully described in a copending application of Canterino and Baptist, Serial No. 446,666, filed July 29, 1954. Regardless of the method of chlorination, the chlorinated ethylene polymers employed in the compositions of this invention generally contain between 10 and 50 weight percent chlorine and preferably contain between 20 and 40 weight percent chlorine.

The chlorinated polymers are rubbery materials having a softening point generally lower than the parent polyethylene. Polyethylene prepared according to the described procedure and having a molecular weight of about 50,000 will have a softening point in the order of 260° F. and polyethylene having a molecular weight in the range 15,000 to 20,000 will have a softening point in the order of 248° F.

Blending of petroleum pitch with chlorinated ethylene polymers can be effected by any suitable means such as on a hot roll mill, in a Banbury mixer, or the like. The blending temperature should be high enough to cause softening of the materials being blended in order that a homogeneous product will result. The softening point of the chlorinated polyethylene will generally be below 300° F. The addition of chlorine to polyethylene causes an initial reduction in the softening point. At chlorine contents of 20 to 40 weight percent, the material goes through a rubbery state. When the chlorine content is increased to amounts in excess of 50 weight percent, the material becomes harder and glassy.

The amount of chlorinated ethylene polymer used can be in the range of 15 to 90 parts by weight per 100 parts of the total composition and is preferably in the range between 15 and 50 parts by weight per 100 parts of the total composition. Products obtained when the components are employed in the ranges stated are tough and flexible, and in any given system, an increase in flexibility is observed as the proportion of chlorinated ethylene polymer is increased. The pitch and the chlorinated polyethylene described herein are compatible in the proportion disclosed and each contributes a desirable characteristic to the final composition. Thus a composition comprising a major portion of chlorinated polyethylene and a minor portion of pitch provides a material for preparing laminated articles which is waterproof, strong and resistant to shock. Products suitable for some applications can be prepared when the amount of chlorinated ethylene polymer is less than 15 parts by weight per 100 parts of the composition. Such materials, however, are fairly brittle and their uses would be limited.

The petroleum pitch compositions herein described have numerous uses. Flexible paper laminates can be readily prepared which remain flexible at the temperature of ice water. Paper laminates can be prepared by coating paper with the pitch composition and pressing the coated sheets of paper together while applying heat so as to cause bonding of the sheets of paper. Waterproof bags and other packaging materials can be prepared from such laminates. The compositions can be applied as waterproof coatings for paper, fabrics, and the like. They are sufficiently adhesive in character as to be applicable as binders for pressed wood. They can also be employed as potting compounds.

The compositions can be applied to surfaces as hot melt coatings by any method such as a roller coater or by extrusion. They can also be applied in solution in hydrocarbon or chlorinated hydrocarbon solvents by brushing or spraying.

The following specific embodiments will serve to illustrate methods for practicing the invention but are not to be construed as limiting the invention.

Ethylene was polymerized over a chromium oxide-silica-alumina catalyst containing 2.4 weight percent chromium as chromium oxide (including hexavalent chromium) at 320° F. and a pressure of 400 p.s.i.g., a space velocity (volumes liquid/volume reactor/hour) of 6, and a feed containing 2.0 weight percent ethylene in isooctane (2,2,4-trimethylpentane). The ethylene feed rate was 1.3 pounds/hour and the isooctane flow was 11 gallons/hour. The polyethylene obtained was insoluble in benzene and acetone, had a density of 0.951, a softening point of 248° F. (method of Karrer, Davis, and Dieterick, Ind. Eng. Chem., Anal. Ed. 2, 96–99 (1930)), a tensile strength of 2000–2100 p.s.i., an inherent viscosity of 0.615, and a molecular weight of 15,040. It was substantially insoluble in carbon tetrachloride under reflux conditions at atmospheric pressure.

The ethylene polymer was dissolved at the rate of 400 grams of polymer per 3 liters of tetrachloroethane and chlorine was then bubbled through the solution at atmospheric pressure, at a temperature of 212 to 230° F. and in the presence of ultra-violet light. Two runs were made to prepare products having chlorine contents of 23 and 33 weight percent chlorine, respectively. Upon completion of each reaction, the material was poured into isopropyl alcohol, washed several times with isopropyl alcohol, and dried in a vacuum oven at 122° F. for a period of 24 to 48 hours. The polymer containing 23 percent chlorine had a softening point of 117° F. and the polymer containing 33 percent chlorine was soft at room temperature.

The chlorinated ethylene polymer having a chlorine content of 23 weight percent was blended with petroleum pitch having a softening temperature of 225–240° F. and a penetration at 115° F. (100 grams for 5 seconds) of 0. The components were employed in 50/50 proportions by weight and blending was accomplished by heating and stirring the mixture at approximately 300° F. for 15 minutes. A homogeneous product resulted which was tough and flexible.

A small quantity of the chlorinated ethylene polymer/petroleum pitch blend was applied to a 6" x 6" square of kraft paper. It was covered with a 6" x 6" square of paper and placed between platens and heated under pressure at a temperature of approximately 250° F. A flexible paper laminate was obtained.

A 50/50 blend of ethylene polymer, not chlorinated, and petroleum pitch was prepared as described above, i.e., the mixture was stirred and heated for 15 minutes at approximately 250° F. to obtain a homogeneous blend. The product was very brittle at room temperature and was not considered suitable for making a paper laminate.

The chlorinated ethylene polymer having a chlorine content of 33 weight percent was blended with the petroleum pitch hereinbefore described. Blends containing pitch and chlorinated polymer in 90/10 and 80/20 weight ratios were preparaed by heating and stirring the mixture for 15 minutes at 300° F. Homogeneous products were obtained. Paper laminates were prepared as hereinbefore described. The one prepared from the 90/10 composition cracked when bent through a 180 degree angle at room temperature. The laminate prepared from the 80/20 composition was flexible at room temperature and when immersed in cold tap water.

Reasonable variations and modifications are possible within the scope of the disclosure of the present invention, the essence of which is the discovery that flexible, tough compositions can be prepared by incorporating pitch with chlorinated polyethylene prepared by polymerizing ethylene at a temperature not over 500° F. in the presence of a chromium oxide-silica-alumina catalyst and chlorinating the resulting polymer.

That which is claimed is:

1. A composition comprising a blend of pitch selected from the group consisting of petroleum pitch and coal tar pitch and a halogenated solid polymer of a 1-olefin containing no more than 8 carbon atoms per molecule and no branching nearer the double bond than the 4-position wherein the halogenated polymer contains from 10 to 50 weight percent halogen.

2. A composition according to claim 1 wherein the pitch is petroleum pitch having a softening point in the range 180 to 240° F.

3. A composition according to claim 1 wherein the halogenated polymer is chlorinated polyethylene wherein the polyethylene has a density at 20° C. of about 0.95 to about 0.99.

4. The composition of claim 1 wherein the pitch is coal-tar pitch having a softening point in the range 180 to 240° F.

5. A composition according to claim 1 wherein the halogenated polymer is chlorinated polyethylene.

6. A composition comprising petroleum pitch having a softening point in the range 180 to 240° F. and having incorporated therein from 15 to 50 parts by weight per 100 parts of the total composition of a chlorinated polyethylene containing 10 to 50 weight percent chlorine wherein the polyethylene has a density at 20° C. of about 0.95 to about 0.99.

7. A process for coating an article which comprises admixing at a temperature above the melting point, pitch selected from the group consisting of petroleum pitch and coal tar pitch and having a softening point in the range 180 to 240° F. with chlorinated polyethylene wherein the polyethylene has a density at 20° C. of about 0.95 to about 0.99; applying a coating of the admixture to the article; and cooling the coated article.

8. The process of claim 7 wherein the article is paper.
9. The process of claim 7 wherein the article is textile.
10. The process of claim 7 wherein the article is wood.
11. The process of claim 7 wherein the article is concrete.
12. A laminated article comprising sheets of solid material bonded together by a binder comprising a blend of pitch selected from the group consisting of petroleum pitch and coal tar pitch and chlorinated solid polyethylene.
13. An article according to claim 12 wherein the layers of solid material are paper.
14. An article according to claim 12 wherein the layers of solid material are textile.
15. An article according to claim 12 wherein the layers of solid material are wood.
16. A laminated article containing between the sheets of laminae a binder comprising a mixture of pitch selected from the group consisting of petroleum pitch and coal tar pitch and having a softening point in the range 180 to 240° F. with chlorinated solid polyethylene wherein the polyethylene has a density at 20° C. of about 0.95 to about 0.99.

References Cited in the file of this patent

UNITED STATES PATENTS

| | | |
|---|---|---|
| 426,633 | Bird | Apr. 29, 1890 |
| 2,224,944 | Young | Dec. 17, 1940 |
| 2,403,179 | Hull et al. | July 2, 1946 |
| 2,467,550 | Fletcher et al. | Apr. 19, 1949 |
| 2,480,298 | Happoldt | Aug. 30, 1949 |
| 2,635,085 | Gonnard et al. | Apr. 14, 1953 |
| 2,715,615 | De Bell et al. | Aug. 16, 1955 |

FOREIGN PATENTS

"Vinyl and Related Polymers," by C. E. Schildknecht, John Wiley and Sons, Inc., New York, N.Y., pages 527 and 528.